United States Patent
Schwartz

[15] 3,640,662
[45] Feb. 8, 1972

[54] INJECTION MOLDING MACHINE WITH HIGH-FREQUENCY DIELECTRIC HEATER

[72] Inventor: William H. Schwartz, University Heights, Ohio

[73] Assignee: Lester Engineering Company, Cleveland, Ohio

[22] Filed: Dec. 23, 1969

[21] Appl. No.: 868,726

[52] U.S. Cl. .................................. 425/174, 425/144, 425/243
[51] Int. Cl. ............................................................. B29f 1/08
[58] Field of Search .......... 18/30 AM, 30 AA, 30 AS, 30 HQ, 18/30 FJ, 30 JA, 30 PS, 30 RM, 30 RH, 30 RV; 264/328

[56] References Cited

UNITED STATES PATENTS

| 2,436,999 | 3/1948 | MacMillin | 18/30 HQ X |
| 2,477,258 | 7/1949 | MacMillin | 18/30 FJ |
| 2,479,383 | 8/1949 | MacMillin | 18/30 FJ |

*Primary Examiner*—J. Spencer Overholser
*Assistant Examiner*—Norman E. Lehrer
*Attorney*—Oberlin, Maky, Donnelly & Renner

[57] ABSTRACT

A system for dielectrically heating primarily glass fiber filled polyester materials in an indexing-type injection molding machine. The machine is indexable between a shot-receiving and shot-ejecting position and several forms of dielectric apparatus are shown for heating the shot to achieve a partial cure in one or more of these positions, or in an advance-receiving arrangement. In at least one species of the invention correlation between position of the shot in the molding machine and operation of the dielectric heater is automatically effected to achieve a high efficiency of operation. A system for controlling the operational steps of the molding machine is disclosed, a portion of the sequencing being dependent upon a predetermined level of heating of the shot material.

4 Claims, 8 Drawing Figures

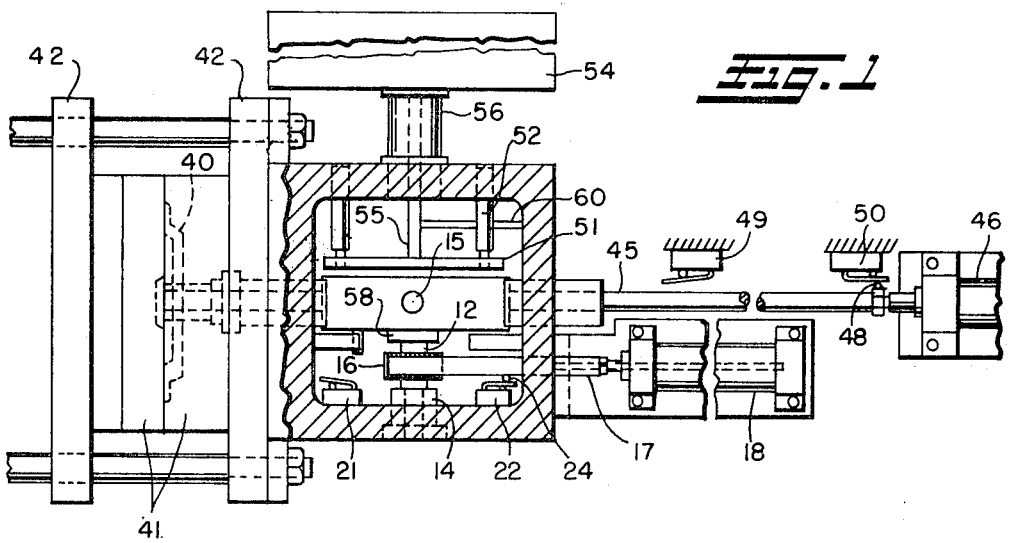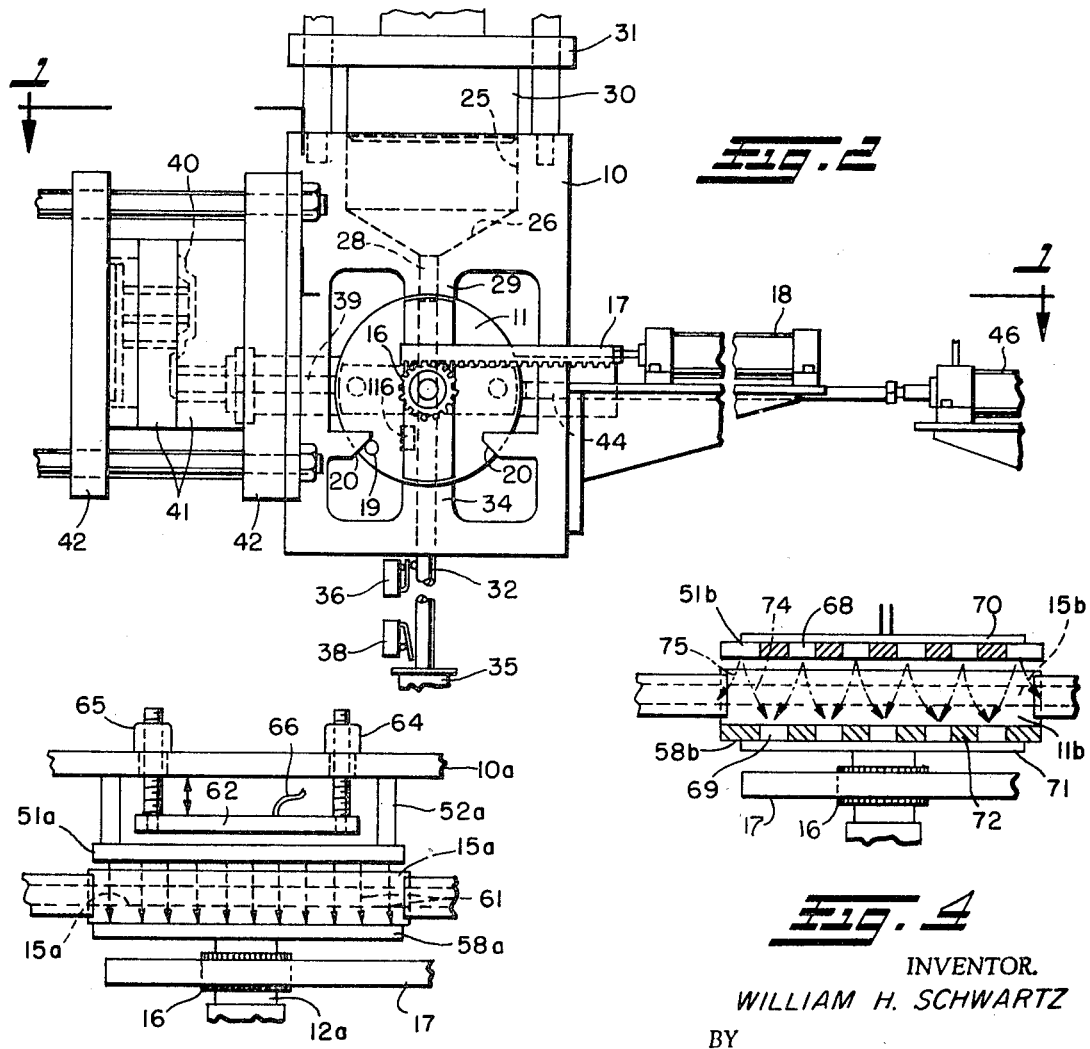
INVENTOR.
WILLIAM H. SCHWARTZ
BY
Oberlin, Maky, Donnelly & Renner
ATTORNEYS

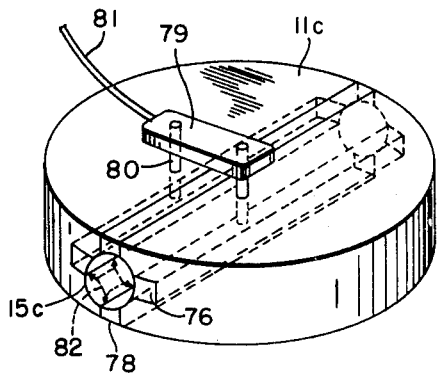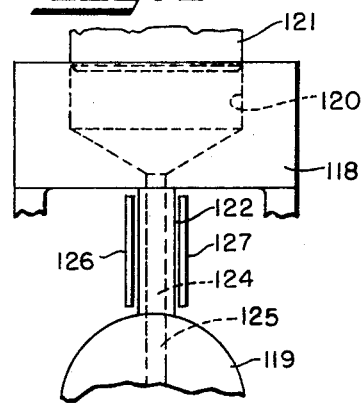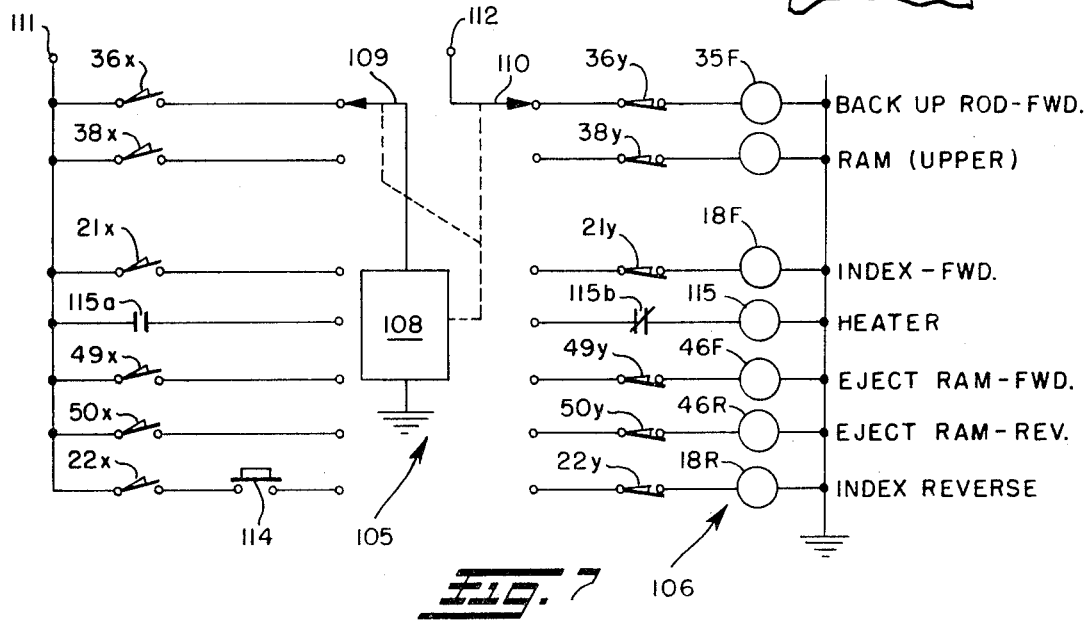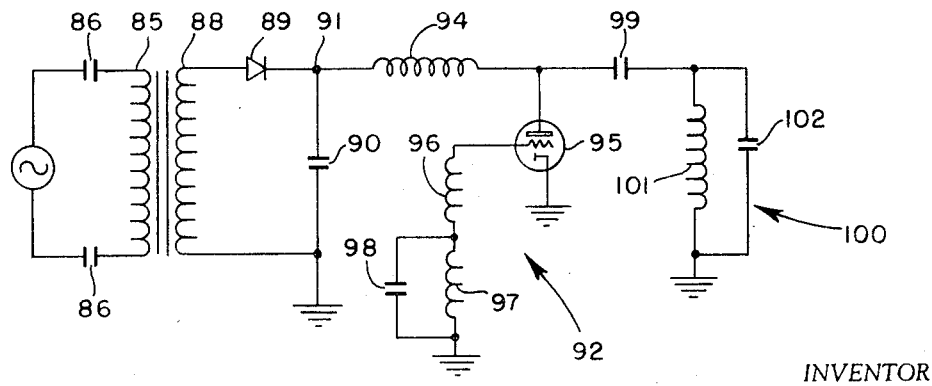

INJECTION MOLDING MACHINE WITH HIGH-FREQUENCY DIELECTRIC HEATER

This invention relates generally to injection molding machines and more particularly to apparatus for applying dielectric heat to material in an indexing shot-type injection molding machine.

One of the problems encountered with the molding of polyester-type materials having a glass fiber filler is the ability to produce high-impact strength products in a reasonable amount of time. Although injection molding with a screw-type machine has been employed in the past, this technique presents problems with the glass fiber filled materials in that excessive working of the material produces a disorientation of the glass fiber strands from that distribution achieved in a premixed batch. This has resulted in widespread use of the compression molding technique wherein batches of slugs are prepared for the molding process but such technique is also limited in that the bench life of such batches places a limit on the quantity of material that can be produced and the rate of production of same.

The shot-type injection molding machine is advantageous in the working of glass fiber filled polyester materials in that excessive working of the material does not occur and it would be desirable to utilize such machine in high-production application.

Such machines have been given consideration in the past but in order to achieve a reasonable degree of efficiency of operation, it is necessary to incorporate a portion of the curing cycle with that of the shot preparation cycle. The most convenient way of accomplishing this is to utilize a direct resistance heating technique for conductively elevating the temperature of the shot of material. Such a technique, of course, has drawbacks in that the elevating heat must be transmitted through the medium of the machine itself, and no close control over the end temperature can be obtained. Further, since conduction occurs from the outside of the shot toward the center a substantial temperature gradient occurs within the material which must be accommodated in the final curing of the molded product and which introduces a variation in the working of the shot while within the injection machine.

It would be desirable to provide apparatus which would allow a close control of temperature levels in a shot-type injection molding machine and which can be utilized reliably as effecting a partial cure of the end product to reduce the cycling time of the machine.

Therefore it is a primary object of this invention to provide injection molding apparatus incorporating dielectric heating for elevating the temperature of the shot material.

It is another object of this invention to provide an injection molding machine having a dielectric heater incorporated therein, which heater is integrally related with the cycle of operation of the molding machine.

It is yet another object of this invention to provide an injection molding machine of the indexing type wherein dielectric heating is applied in direct relation to position of an indexing member of the machine.

It is yet another object of this invention to provide injection molding apparatus which advantageously employs dielectric heating in a shot preparation stage of the machine wherein dielectric heating can occur simultaneously with preparation and indexing of the machine.

It is a yet further object of this invention to provide improved electrode arrangements for use in the dielectric heating portion of an injection molding machine.

Dielectric heating is especially suited for utilization in the curing of glass fiber fill polyester materials in that considerable control can be attained over the distribution of heat and temperature gradients within the material to avoid unwanted complete curing or inconsistent working characteristics of the material. Such heating technique involves the setting up of a field of energy in an electrode arrangement whereby molecules of susceptible material exposed to such field are excited and obtain an elevated temperature. It is well known that extremely high frequencies of operation and voltage levels must be attained in order to create a suitable field in this type of heating and that the electrode arrangement is significant in achieving a desired direction for the field. In the past, however due to the extremely high-energy levels and the difficulty of controlling same, little attention has been directed to the utilization of such heating energy in a manufacturing procedure which involves substantial inherent mechanical variation. However, the desirable characteristics of such heating technique is so great in producing an even distribution of heat within the material, commonly referred to as a heating effect occurring from within, that an improved end product can be obtained by the combination of the dielectric heating technique in the injection molding type of machine.

In the drawings:

FIG. 1 is a plan view with parts cut away of the injection molding machine of the invention with the shot cylinder oriented in the shot-receiving position;

FIG. 2 is an elevational view with parts cut away of the apparatus depicted in FIG. 1;

FIGS. 3, 4 and 5 are isolated views of various electrode arrangements which may be utilized in the injection molding machine of FIGS. 1 and 2;

FIG. 6 is an elevational view of a further modification of the invention;

FIG. 7 is an electrical schematic diagram of the control system; and

FIG. 8 is an electrical circuit diagram of the heating apparatus of the invention.

Referring now to FIGS. 1 and 2, respectively being the plan and elevational views of the apparatus forming the injection molding machine of the invention, there is shown a shot frame 10 for support of the components of the machine. Such shot frame is generally of open side cubicle construction and supports therein a shot wheel member 11 for indexing between shot receiving and shot ejecting positions. The apparatus of the invention is disclosed in greater detail in applicant's copending application Ser. No. 793,838 including a description of the sequence of operations and the functions of the components of the machine. For purposes of understanding the details of operation of this invention, however, only a general description of the interrelation of components is required from which the operation of this machine system will become clear.

The shot wheel 11 is mounted on a stub shaft 12 journaled in a bearing 14 in the shot frame for indexing movement between the material receiving and ejection positions. The wheel 11 is a cylindrical solid structure and is bored or otherwise apertured along a diameter thereof to form a shot cylinder 15 for receipt of the molding material. The wheel 11 is fabricated of some material which is not affected by the electrical field of the dielectric heating apparatus to be described in more detail hereinafter and preferably is of a molded ceramic construction to provide sufficient strength for withstanding the injecting pressures, although other insulative material such as Teflon would be suitable for this application.

Also mounted on the stub shaft 12, for imparting movement thereto, is a pinion 16 which cooperates with a rack 17 connected in turn to a double acting hydraulic ram 18. Indexing movement is then imparted to the wheel 11 by the application of fluid under pressure to the hydraulic ram 18 under direction of a pair of solenoid-actuated fluid valves, the end limits of the wheel 11 being determined by the abutment of a stop rod 19 mounted on the wheel with one of a pair of abutment surfaces 20 of the frame 10 in alignment with the stop rod 19. An electrical designation of the wheel 11 position is also provided through the cooperation of a pair of microswitch-type limit switches 21, 22 fixedly mounted with respect to the shot frame 10 for cooperation with a cam 24 carried by the rack 17 and arranged for actuation when the wheel 11 is in either end position.

The upper portion of the frame 10 is formed in the configuration of a cylindrical chamber 25 having a lower conical surface 26 communicating with a passage 28 located in a downward protrusion 29 of the frame. The passage 28 is of cylindrical configuration matching that of the shot cylinder 15 and aligned therewith when the shot cylinder 15 is in the vertical or material receiving position as depicted in FIGS. 1 and 2. The chamber 25 is adapted for loading with the fiber-filled polyester material to be used in the molding cycles and receives a squeeze piston 30 mounted in a frame 31 at the upper portion of the shot frame 10 and actuated by a hydraulic ram (not shown) in the controlled cycle to be described.

A backup plunger 32 is provided in the lower portion of the shot frame 10 being guided through a cylindrical opening in an upward protrusion 34 of the frame for entrance into the shot cylinder 15. The backup plunger 32 normally lies outside the confines of the wheel 11 but is moved to a position within the wheel when the latter is in the shot-receiving position as indicated in FIG. 2 by a solenoid-controlled ram 35. In typical operation then, the backup plunger 32 is inserted in the shot wheel 11 and the squeeze piston 30 is actuated to force material through passage 28 into the shot cylinder 15, thereby forcing the backup plunger 32 to a retracted position by means of a bleed arrangement in the hydraulic line of the backup ram 35. The position of the backup plunger 32 within the wheel 11 and in a retracted position clear of the wheel is detected by a pair of microswitches 36, 38 which may be mounted on an extension of the frame 10. It is clear that additional switches may be associated with the backup plunger 32 to detect intermediate positions thereof or the switches 36, 38 may be adjustably mounted, in order to vary the quantity of material introduced into the shot cylinder 15 as will be described with reference to the sequence of operation of the molding machine.

When the wheel 11 is indexed to the shot ejection position the shot cylinder 15 is then in alignment with a further pair of apertures in the shot frame 10, these being a first cylindrical passage 39 communicating with a die cavity 40 formed between movable and fixed dies 41 supported on movable and fixed platens 42 in turn supported on the frame 10. The movable platen 42 is actuated by a clamping mechanism (not shown) and the die cavity 40, after receipt of the molding material, is subjected to further heating for final curing of the material contained therein.

The second aperture 44 in alignment with the shot cylinder 15 guides movement of an ejection rod 45 which is transported through the shot cylinder 15 to displace the material from within the wheel 11 into the die cavity 40, under actuation of a double-acting hydraulic ram 46, the end positions being detected by a suitable cam 48 and microswitch pair 49, 50 associated with the rod 45.

In order to increase the efficiency of the injection molding machine it is desirable to elevate the temperature of a quantity of the material from the chamber 25 to bring about a partial curing which then is completed when the material has been injected into the die cavity 40. In the type of glass fiber filled polyester material with which this invention is primarily concerned, a polymerization temperature of approximately 320°F. may be considered as optimum for curing purposes to achieve desired characteristics in the finished end product. It has been determined that if the material is brought to a certain percentage of this optimum temperature, for example, approximately 280°F, suitable working characteristics of the material can be retained while achieving the advantage of accomplishing the great portion of the curing cycle prior to injection into the die mold. In this embodiment of the invention the advantages of dielectric heat may be utilized to the utmost wherein the heating strength may be concentrated at a desired area and a close control can be attained over the time of application of heat and the effect of same upon the material.

The dielectric heating apparatus is depicted in a first form in FIGS. 1 and 2 wherein a plate 51 of generally rectangular configuration is mounted within the shot frame 10 on a pair of insulating support members 52, closely adjacent one side of the wheel 11 and generally in alignment with the shot cylinder 15 when the latter is in the injecting position, i.e., that position displaced 90° from that depicted in FIGS. 1 and 2. An RF generator 54 is shown in FIG. 1 situated adjacent the shot frame 10 with a high-potential electrical connection being made to the plate 51 by means of a conductive rod 55. The rod 55 passes through the side of the shot frame 10 which is sufficiently apertured so as to provide adequate isolation for the high-frequency energy. Ground connection is made by way of a conductive conduit 56 connected between the RF generator 54 and the shot frame 10, the conduit 56 serving to shield the connection to prevent radiation of the energy. Similarly, although not shown in these drawings, it is desirable to entirely enclose the shot frame 10 to prevent stray radiation. This may conveniently be done by the attachment of thin conductive sheets over the open areas of the shot frame, which is at ground potential thereby eliminating hazards to operating personnel.

A second plate 58 of generally the same configuration as plate 51 is mounted on the stub shaft 12 and on the wheel 11 lying in alignment with the shot cylinder 15 in all positions. The second plate 58 and the stub shaft 12 provide an electrical connection to the grounded shot frame 10 and it is clear that when the wheel 11 is indexed to the inject position, a substantially direct field of electric energy will be established between the plates 51, 58 passing through a portion of the wheel 11 and encompassing the material contained in the shot cylinder 15. The plates 51, 58 thus act as capacitor in the electrical output circuit of the RF generator 54, providing a maximum capacitance condition when in parallel alignment and a minimum capacitance when at 90° to one another. It will be apparent then that if the output circuit is tuned to provide a maximum transfer of power between the plates 51, 58 when in the inject position that movement of the shot wheel 11 to the receiving position will cause a detuning of the circuit and an automatic diminution of the power from the RF generator 54, thereby providing an automatic control of the output power level dependent upon position of the shot wheel 11.

Tuning of the output circuit of the RF generator 54 may be accomplished in various ways including an adjustment of the plate 51 with respect to the shot frame 10 in that there is a capacitance effect between such high potential and grounded potential areas. Inductance in the output circuit is contributed by the length of connecting rod 55, the high-potential plate 51 and a tuning stub 60 comprising a length of conductive tubing connected to the rod 55 at one end and at the other end to the shot frame 10. At the high frequencies of operation of the RF generator which typically is in the range of megacycles, such inductive effect is readily realized.

Referring now to FIG. 3, another embodiment of the electrode arrangement and coupling for the RF generator is shown wherein parts corresponding to those previously described are identified with corresponding numerals with the subscript a appended thereto.

In this embodiment of the invention the shot wheel 11a is shown in the shot-injecting position, again mounted on a stub shaft 12a along with the grounded plate 58a of the output load circuit for indexing movement by the rack mechanism. The high-potential plate 51a is mounted in fixed relation to the shot frame 10a on a pair of insulators 52a and as previously noted such plates 51a, 58a may comprise rectangular plates having a width approximating the diameter of the shot cylinder 15a or alternatively may comprise completely circular plates approximating the periphery of the shot wheel 11a so that RF energy is continuously coupled therebetween and not dependent on wheel position. The field of energy between the plates is depicted by a series of dashed arrows 61 indicating the generally straight field of energy developed in this electrode arrangement.

In this embodiment an auxiliary plate 62 is mounted on the shot frame 10a on a pair of insulating standards 64 which comprise threaded members received in nuts 65 fixed to the shot frame and rotatably mounted in the plate 62 so that adjustment of the position of the plate 62 relative to plate 51a may be made. Electrical connection is made to the auxiliary plate 62 by a flexible cable 66 leading to the RF generator which allows a freedom of movement. The auxiliary plate 62 and the electrode plate 51a thus form a capacitor for variably coupling the energy from the RF generator into the material in the shot cylinder 15a. Such arrangement also allows a convenient manner for tuning the output load circuit of the RF generator as well as for affecting the quantity of energy coupled to the ground plate 58a.

Although a relatively evenly distributed electric field is developed in this electrode arrangement further efficiencies can be realized by various other electrode configurations commensurate with an evenness of heating throughout the shot cylinder.

Thus in FIG. 4 yet another embodiment of electrode arrangement is depicted wherein both the energized and grounded plates 51b, 58b are formed of segments of conductive and insulating material arranged linearly along the shot cylinder 15b, the conductive segments 68, 69 being electrically tied together through respective conductive backup plates 70, 71. The conductive segments 68 of the energized plate 51b are arranged to lie opposite the nonconductive segments 72 of the ground plate 58b so that electric fields indicated by the arrows 74 are established in a more longitudinal sense than the direct transverse arrangement depicted in FIG. 3.

Such arrangement allows the same amount of material contained within the shot cylinder 15b to be exposed to a less intensive electric field than realized in the FIG. 3 embodiment but having greater length of traverse whereby a greater efficiency of utilization of RF energy is realized. It will be noted that an end effect occurs here also, as it does in the FIG. 3 embodiment, wherein part of the electric field is directed to grounded objects closely abutting the shot wheel 11b as indicated by the dashed end arrows 75 in FIG. 4. The extended length of energy field however assures an even distribution of heat throughout the shot cylinder 15b and will tend to minimize the effect of directing an electric field through a cylindrical member from a pair of parallel plane plates 51a, 58a as in FIG. 3, wherein the center portion of the shot cylinder 15 may be exposed to an additional heating effect.

In FIG. 5 yet another embodiment of electrodes for the dielectric heating arrangement is depicted in a perspective view of the shot wheel 11c. In this embodiment of the invention the shot wheel 11c may be mounted in the manner described in FIGS. 1 and 2, but in this arrangement a stray electric field is developed within the shot cylinder 15c as opposed to the direct electric fields realized in the FIGS. 1-4 embodiments.

The electrodes are arranged as a pair of energized electrodes 76 and an alternate pair of grounded electrodes 78 equally arranged about the periphery of the shot cylinder 15c and embedded in the shot wheel 11c. The electrodes 76, 78 are bars of conductive material extending the full diameter of the shot wheel 11c, having arcuate inner surfaces adjacent the shot cylinder, thereby forming a portion of the shot cylinder 15c. The energized electrodes 76 are electrically connected to one another by means of a conductive strap 79 and a pair of conductive rods 80 threaded into the electrodes. The strap 79 in turn is connected to the output of the RF generator by a flexible cable 81 to accommodate the indexing movement of the shot wheel. The grounded electrodes 78 being exposed on the flat surfaces of the shot wheel 11c are coupled in any convenient manner and electrical connection to the shot frame may be made through stub shaft as in the FIGS. 1-4 embodiments.

The effect of this electrode arrangement then is to establish electric fields generally of the character indicated by the curved arrows 82 in FIG. 5, such electric fields minimally transversing the central portion of the shot cylinder but having an overlapping effect at this point to create an even distribution of electric energy in the shot cylinder 15c. It is apparent that any number of electrodes 76, 78 may be arranged in a similar manner about the periphery of the shot cylinder 15c to vary the evenness of distribution of the electric field and to achieve an optimum load upon the RF generator. This technique is advantageous in that the electrodes 76, 78 are adjacent the material contained within the shot cylinder 15c thereby eliminating the airspaces inherent in the FIGS. 1-4 embodiments and allowing the coupling of a great quantity of the RF energy into the material in the shot cylinder.

Referring now to FIG. 8 there is shown an electrical schematic diagram of the RF generator and electrode arrangement for producing the dielectric heating energy in all embodiments of the invention. Such circuit is essentially an oscillator circuit capable of operating in the megacycle frequency range and may take many different forms this being but one example of a utilizable circuit.

Typically power is received from an AC source of supply 84 and is coupled to the primary winding 85 of a power transformer through a pair of normally open contacts 86 which may be remotely controlled as will be described in more detail hereinafter. The voltage of the secondary winding 88 of the transformer is rectified by a diode 89 and filtered in capacitor 90 to provide a DC output at terminal 91. The output voltage is applied to the oscillator circuit 92 through an RF choke 94, which prevents the RF oscillations from reaching the diode 89, and is applied to the plate electrode of a high-frequency oscillator tube 95. Typically the tube 95 has the cathode connected directly to ground and the grid electrode connected to a tuned circuit comprising series-connected inductors 96, 97 and capacitor 98 in parallel connection across the latter inductor 97.

The plate of the tube 95 is connected via a coupling capacitor 99 to the tuned load circuit 100 comprising effectively a parallel-connected inductor 101 and capacitor 102 (as previously mentioned the inductor 101 may comprise a tuning stub 60 located within the shot frame 10 or may be inherently realized in the form of apparatus), these being engineering considerations well understood in the high-frequency field of art. The capacitor 102 in the tuned load circuit 100 represents the capacitive effect produced by any of the electrode arrangements described herein and it will be apparent that the working energy of the circuit is realized between the plates of the capacitor.

The oscillator 92 thus comprises a tuned load, tuned grid circuit, the tube 95 having sufficient interelectrode capacitance to sustain oscillation and it is one advantage of this invention that such circuit can be rapidly switched between oscillating and nonoscillating conditions to accurately control the energy applied to the electrode arrangements. Conventionally the filament (now shown) of the oscillator tube 95 will be energized from a suitable power source prior to application of anode power to avoid damage to the tube 95 as is well known in this art and will be considered as continuously energized for purposes of this description.

Referring now to FIG. 7, there is shown a circuit for completely controlling the cycle of operation of the injection molding machine requiring only a stepping switch 105, a plurality of solenoids 106 for controlling the various functions together with interlocking and position-determining switches. Numerals corresponding to the components depicted in FIGS. 1 and 2 with appropriate letters appended will be utilized in order to aid in an understanding of the control system and the description of operation of the cycle will be related to the same figures.

The stepping switch 105 comprises a solenoid coil 108 which effects simultaneous stripping of a pair of sliders 109, 110 in two decks of contacts. The solenoid coil 108 is connected at one end to ground and receives power from an input terminal 111 by way of an array of contacts and switches. All solenoids 106 are connected in common to ground and receive energizing power from the slider 110, connected in turn to an input terminal 112 receiving a source of power, energization again being controlled by a plurality of switches and contacts.

The cycle of operation is initiated then with the stepping switch in the last or lowermost position with power applied to the input terminals 111, 112. The shot wheel 11 is in the material-receiving position and microswitch 22 is actuated by cam 24. Contact 22x of microswitch 22 is in the now-closed position and the circuit is in preparedness for initiation of the cycle. The cycle start switch 114 may be manually actuated to apply power to the solenoid coil 108 thereby moving the sliders 109, 110 to the first position as depicted in FIG. 7. Cycle start switch 114 may be of the spring-loaded type if only single cycles of operation are required wherein closure of the switch 114 is necessary for each cycle of operation or alternatively may remain in a closed position for continuing cycles of operation. In the first position power is applied to solenoid 35F through normally closed contact 36y of microswitch 36, the solenoid 35F applying fluid to the backup rod ram 35 to cause movement of the rod 32 into the shot cylinder 15. Upon reaching the upper limit of movement microswitch 36 is actuated to open contact 36y to remove power from solenoid 35F and thus ram 35, and close contact 36x applying power to the solenoid coil 108 to cause stepping of the sliders 109, 110 to the second position.

In the second position the ram controlling the squeeze piston 30 is energized through contact 38y thereby forcing material through passage 28 and into the shot cylinder 15. The backup rod 32 is forced backwardly via the bleed arrangement for the ram 35 until microswitch 38 is actuated opening contact 38y, thereby removing power from the ram, and closing contact 38x to cause further stepping of the stepping switch 105.

A similar operation will be obtained for indexing of the shot wheel 11 to the forward or shot-ejecting position whereupon in the fourth position of the stepping switch 105 the heater solenoid 115 will be energized. Several alternatives are available in this point of the cycle of operation including the automatic energization of the high-frequency heat as previously described with respect to indexing movement of the shot wheel and wherein no heater solenoid would be required in the sequence of operations. Preferably, however, high-frequency heat is positively controlled as an independent step in the cycle of operation and two alternatives are feasible once the heater solenoid 115 has been energized.

A heat-sensing element 116 is mounted on the shot wheel closely adjacent the shot cylinder 15 so as to sense the elevation in temperature of the material in the shot cylinder and operative to control actuation of the contacts 115a, b. Such element 116 is preferably a thermistor embedded in the shot wheel 11 having a fairly fast response time and being insensitive to the high-frequency energy. The thermistor is connected to auxiliary electrical circuitry for actuating contacts 115a, b by flexible conducting leads (not shown). Alternatively, the heater solenoid 115 may be a relay of the time-delay type wherein a predetermined time interval for energization of the heater and actuation of contacts 115a, b may be automatically effected. In either event contacts 86 in the primary circuit of the RF generator of FIG. 8 are responsive to solenoid 115 and will be closed for an interval of time to apply power to the output circuit 100 including the electrodes 51, 58.

At the completion of the heating interval the remaining steps of the cycle of operation will take place whereby the eject ram 45 will be moved to a forward and then reverse position, relying on the operation of contacts 49x, 49y and 50x, 50y, and the sliders 109, 110 will sequence to the last position of the stepping switch 105. At this point the shot wheel 11 will be indexed in a reverse direction to the shot-receiving position, solenoid 18R and thus ram 18 being deenergized by the opening of contact 22y and as previously mentioned the cycle will stop here or will be automatically continued depending on the closure of the cycle start switch.

Referring now to FIG. 6, there is shown yet another embodiment of the invention wherein the dielectric heating is applied to the material prior to its introduction into the shot wheel 119 so that a simultaneous heating of the material and injection of the previous shot into the die cavity 40 may be performed resulting in a substantial reduction in cycling time. In this embodiment of the invention the shot frame 118 is modified so that cylindrical chamber 120 for retaining the polyester material and for accepting the squeeze piston 121 is elevated a substantial distance above the shot wheel 119. A tube 122 of insulating material, as the ceramic previously mentioned, is affixed to the shot frame 118 and forms a passage between the chamber 120 and the shot cylinder 125, performing the function of the protrusion 29 described in relation to the FIGS. 1 and 2 embodiment.

A pair of conductive plates 126, 127 of approximately the width of the tube 122 are supported on either side of the tube 122 and form the electrodes for the dielectric heating system, plate 126 being insulatively supported and connected to the energized output of the RF generator and plate 127 being connected to ground.

Thus it will be clear in the cycle of operation that when material is forced into the shot cylinder 125 against the backup rod, as previously described, a definite amount of the material will be left in the tube 122 and may be acted upon by the dielectric heater during the indexing of the shot wheel 119. The length of the tube 122 should be identical to the diameter of the shot wheel 119 when the passage 124 therein and the shot cylinder 125 are of the same diameter, but it is clear that variations may be effected in the apparatus so that it is only necessary to expose the same amount of material to the dielectric heating energy as will be contained within the shot cylinder 125 on the succeeding cycle. It is clear also that the cycle control system depicted in FIG. 7 will be modified in this embodiment of the invention but such adaptation will be well within the skill of the person familiar with this art.

I, therefore, particularly point out and distinctly claim as my invention:

1. An injection molding machine of the shot type comprising an indexable member having a shot cylinder therein for receipt and discharge of a quantity of plastic material, said member being supported for rotation about an axis passing through said shot cylinder between a first shot-receiving position and a second shot-injecting position, a first electrode mounted adjacent said indexable member at one side of said shot cylinder, a second electrode mounted on said indexable member at the opposite side of said shot cylinder, said first and second electrodes defining a field for electric energy through said shot cylinder when brought into alignment with one another by rotation of said indexable member, and a radiofrequency generator operatively interconnected with said first and second electrodes for creating an electric field of heating energy therebetween to elevate the temperature of the plastic material for a partial cure prior to injection.

2. A machine as set forth in claim 1 wherein said first and second electrodes are plates of conductive material, having dimensions conforming substantially to those of said shot cylinder, and adapted to be parallel one another for defining an electric field through said shot cylinder only when said indexable member is in the shot-injecting position.

3. A machine as set forth in claim 1 wherein each of said first and second electrodes comprises a plurality of equally spaced conductive members, the members of said first electrode being alternately disposed in relation to the members of said second electrode and all said members being substantially equally disposed adjacent the shot cylinder to create multiple paths of heating energy through the shot cylinder, means for grounding the members of said second electrode, and means for interconnecting the members of said first electrode.

4. A machine as set forth in claim 3 wherein the members of said first electrode are linearly aligned at one side of the shot cylinder and the members of said second electrode are linearly aligned at the opposite side of the shot cylinder thereby to effect transverse electric fields through the shot cylinder.

* * * * *